Patented Feb. 23, 1932

1,846,721

UNITED STATES PATENT OFFICE

IVAN GUBELMANN AND CLYDE O. HENKE, OF SOUTH MILWAUKEE, WISCONSIN, ASSIGNORS, BY MESNE ASSIGNMENTS, TO NEWPORT INDUSTRIES, INC., A CORPORATION OF DELAWARE

PROCESS OF REFINING WOOD ROSIN

No Drawing.  Application filed July 2, 1928. Serial No. 290,024.

This invention relates to a method of vacuum distilling wood rosin to obtain a higher efficiency in the recovery of the rosin acids in a form suitable for subsequent use in the trade and to an improved rosin product resulting from such method.

It is an object of this invention to provide a method of vacuum distilling wood rosin to the end that both the distillate and the residues obtained may be of sufficiently high quality for the uses to which the various grades of wood rosin are put.

Other and further important objects of this invention will become apparent from the following description and appended claims.

In U. S. Patent No. 1,219,413 to Donk, there is described a method for the continuous vacuum distillation of rosin under high vacuum to produce a light amber colored rosin as distillate. In a copending application of Gubelmann and Lee, Serial No. 217,080, entitled "Process of vacuum distilling rosin" there is disclosed a process whereby there is obtained a refined distillate and a high melting residue, the latter being drawn off continuously. The normal difficulties in the vacuum distillation of wood rosin are described in this copending application.

Briefly, it has been found that the decomposition experienced in the vacuum distillation of wood rosin by any continuous process is due to the prolonged exposure of non-volatilized portions of the wood rosin to the high temperatures prevailing in the still. This was largely overcome by providing for immediate removal of the non-volatilized portions.

We have now found that whereas the wood rosins produced by the continuous distillation method are of sufficiently pale color for many uses, the powdered wood rosin produced from continuously vacuum distilled wood rosin instead of being practically white is of a saffron color. This is possibly due to the slight volatility of some coloring matter in the crude wood rosin. We have now further found that if the wood rosin obtained by the continuous distillation method is redistilled in a batch still, that is, not a continuous still, less decomposition takes place than if crude wood rosin is subjected to the same distillation step.

This may be explained by the assumption that certain of the wood rosin acids present in the crude wood rosin are more easily decomposed by heat than abietic acid and that these more easily decomposed acids are separated to a large extent in the continuous distillation step, being obtained as a residue. For the removal of the compound or compounds causing the saffron color of the powdered wood rosin, we employ a second step of distilling the distillate of the continuous distillation step. By selecting certain fractions of the second, or batch distillate, we obtain an improved grade of wood rosin which when powdered is practically free of the saffron color.

In case a batch distillation is made on the crude wood rosin not only are those difficulties met with, with respect to the decomposition and loss in vacuum, but there is the further disadvantage that the residue obtained in the still is not adapted for uses to which crude wood rosins are put. However, the residues obtained by the combined distillation steps, namely the continuous method and the batch distillation, are both adapted for uses to which wood rosin is usually put. Thus, this combination of the two distilling steps gives use an improved quality of distillate, less decomposition of acid constituents and a larger yield of usable wood rosins.

To illustrate the present invention in a more definite manner, the following example is given and serves to illustrate the embodiment of our preferred method. Crude wood rosin, "E" grade, is continuously distilled in vacuum in such a manner that the ratio of distillate to residue is about 85 to 15. The distillate is then charged into a suitably constructed still. A good vacuum, say 3 millimeters is placed on the still and the contents fractionally distilled. Certain fractions are then collected to provide the desired refined rosin having the property upon powdering of being practically free of color.

It has been our experience that wood rosin of this grade comes over shortly after the start of the distillation and continues until the distillation is practically finished. Near the end of the distillation, the distillate becomes slightly colored and gives the wood rosin which when powdered is of a saffron color. This latter fraction is reserved and may be redistilled with the following batch or by itself to give further quantities of light colored powdered wood rosin.

The residue remaining in the still after the fractional distillation is complete is a dark amber colored product resembling a crude wood rosin in color but has a higher melting point. The quality of the residue can be varied somewhat depending upon the extent to which the distillation is carried.

The wood rosin collected as a special fraction during the batch distillation step and having the property of forming a powder substantially free of saffron color is especially adapted for use in the preparation of the highest grade of paper size. Heretofore, only pure gum rosin could be used for this purpose.

We have found that almost any material can be used for the construction of the still, but we prefer to use enamel or aluminum in order to reduce decomposition to a minimum.

We are aware that numerous details of the process may be varied through a wide range without departing from the principles of this invention, and we, therefore, do not purpose limiting the patent granted hereon otherwise than necessitated by the prior art.

We claim as our invention:

The process of preparing a substantially colorless wood rosin which comprises subjecting wood rosin to a continuous vacuum distillation in such a manner as to maintain a ratio of distillate to residue of about 85 to 15, subjecting the distillate from said distillation to a batch distillation under a vacuum of about 3 mm. of mercury and collecting the distillate from this distillation so long as said distillate remains free from saffron color upon powdering.

In testimony whereof we have hereunto subscribed our names at Carrollville, Milwaukee County, Wis.

IVAN GUBELMANN.
CLYDE O. HENKE.